United States Patent [19]

Hioki et al.

[11] Patent Number: 5,175,080
[45] Date of Patent: Dec. 29, 1992

[54] METHINE COMPOUND AND SILVER HALIDE PHOTOGRAPHIC MATERIAL CONTAINING THE METHINE COMPOUND

[75] Inventors: Takanori Hioki; Takashi Kato; Tadashi Ikeda, all of Kanagawa, Japan

[73] Assignee: Fuji Photo Film Co., Ltd., Kanagawa, Japan

[21] Appl. No.: 772,300

[22] Filed: Oct. 7, 1991

[30] Foreign Application Priority Data

Oct. 8, 1990 [JP] Japan .................. 2-270162

[51] Int. Cl.$^5$ .................. G03C 1/12; G03C 1/28
[52] U.S. Cl. .................. 430/584; 430/576
[58] Field of Search .................. 430/576, 584

[56] References Cited

U.S. PATENT DOCUMENTS 5,093,226  3/1992  Oshima .................. 430/584

Primary Examiner—Charles L. Bowers, Jr.
Assistant Examiner—Janet C. Baxter
Attorney, Agent, or Firm—Sughrue, Mion, Zinn, Macpeak & Seas

[57] ABSTRACT

'Disclosed is a compound represented by the following general formula (I):

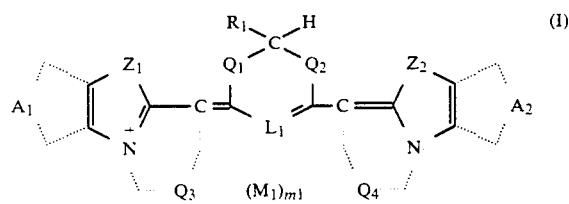

wherein $Z_1$ and $Z_2$ each represents an oxygen atom, a sulfur atom or a selenium atom; $R_1$ represents an alkyl group, an aryl group or a heterocyclic group; $Q_1$ and $Q_2$ each represents a methylene group; $Q_3$ and $Q_4$ each represents an atomic group required to form a five-membered, six-membered or seven-membered ring; $L_1$ represents a methine group; $A_1$ and $A_2$ each represents an atomic group required to form a benzene ring; $M_1$ represents a counter ion for neutralizing the electric charge of the compound; and $m_1$ represents the number required for neutralizing that electric charge.

There is also disclosed a silver halide photographic material containing at least one compound of general formula (I).

6 Claims, No Drawings

METHINE COMPOUND AND SILVER HALIDE PHOTOGRAPHIC MATERIAL CONTAINING THE METHINE COMPOUND

FIELD OF THE INVENTION

This invention relates to a methine compound and a silver halide photographic material containing that compound. More particularly, it relates to a cyanine dye having a specific crosslinking group on its methine chain and a silver halide photographic material containing that cyanine dye.

BACKGROUND OF THE INVENTION

Spectral sensitization is a very important stage in the production of silver halide photographic materials which have high-sensitivity and excellent stability. Many spectral sensitizing agents have been developed, and techniques for the use thereof such as supersensitization methods and addition methods, have been developed.

Spectral sensitizing agents such as cyanine dyes, merocyanine dyes, rhodancyanine dyes, etc., are known as spectral sensitizing dyes for use in spectral sensitization. These agents are used either alone or in combination (e.g., for the purpose of supersensitization).

There are many requirements for the sensitizing dyes used in photographic materials to meet. For example, sensitizing dyes must meet the requirements that high spectral sensitivity can be obtained, that fogging is not increased, that changes in the sensitivity, gradation and fog of samples excellent in characteristics during exposure (e.g., latent image stability, reciprocity characteristics, temperature and humidity dependence during exposure, etc.) are small during storage before exposure, and that the dyes are not left behind in the photographic materials after development.

Among these requirements, high sensitivity and high stability during storage are essential. Many attempts have been made.

For example, various compounds have been proposed in JP-A-60-202436 (the term "JP-A" as used herein means an "unexamined published Japanese patent application"), JP-A-60-220339, JP-A-60-225147, JP-A-61-123834, JP-A-62-87953, JP-A-63-264743, JP-A-1-155334, JP-A-1-177533, JP-A-1-198743, JP-A-1-216342, JP-A-2-42, JP-B-60-57583 (the term "JP-B" as used herein means an "examined Japanese patent publication") and U.S. Pat. 4,618,570. However, the level of improvement is still not sufficient.

Further it is important that various dyes are added to silver halide photographic materials to improve their sharpness and color separation power.

Conventional pentamethinecyanine dyes wherein the 2- and 4-positions on the methine chain are substituted by a trimethylene crosslinking group and further the 1- and 5-positions are combined together with the N-position of the basic nucleus to form a ring include 2,2'-dimethyltrimethylene-crosslinked dyes (the following A, B and C) described in J. Am. Chem. Soc., Vol. 109, pp. 5808–5813 (1987), J. Org. Chem., Vol. 55, pp. 49–57 (1990) and Prc. Electrochem. Soc., Vol. 88, No. 14, pp. 97–104 (1988), and unsubstituted trimethylene-crosslinked dye (the following D) described in Ukr. Khim. Zh., Vol. 14, No. 11, pp. 1165–1170 (1975). The use of the dye A in microcrystalline silver bromide is reported in Prc. Electrochem. Soc., Vol. 88, No. 14, pp. 97–104 (1988).

However, dyes having a trimethylene crosslinked group wherein the 2-position of the above-described trimethylene-crosslinked group is only once substituted by an alkyl group, an aryl group or a heterocyclic group according to the present invention, are not known, nor of course is the photographic performance thereof in silver halide photographic materials.

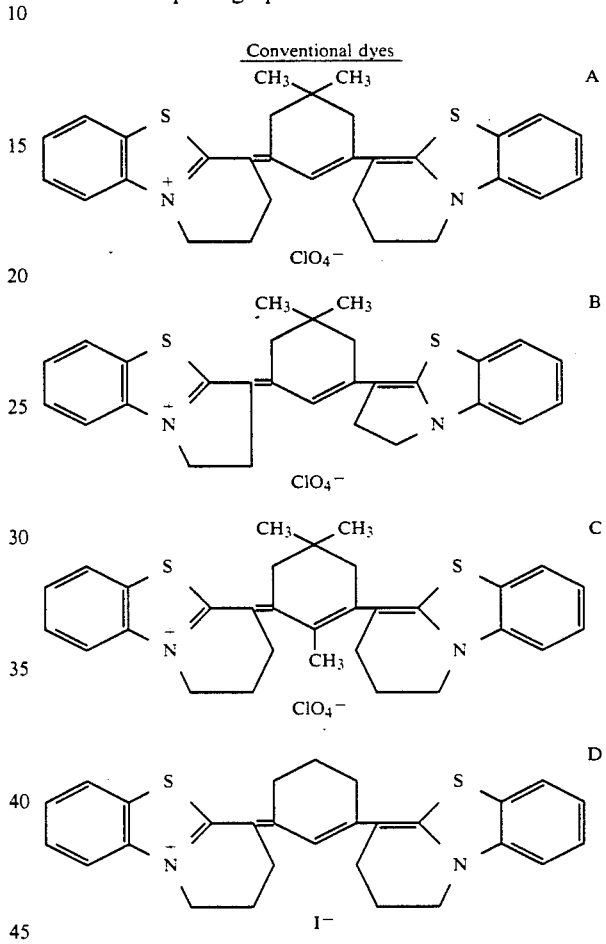

Supersensitization is described in Photographic Science and Engineering, vol. 13, pp. 13–17 (1969), ibid., Vol. 18, pp. 418–430 (1974), and James, The Theory of the Photographic Process, the fourth edition, p. 259 (Macmillan 1977). It is known that high sensitivity can be obtained by properly choosing the sensitizing dyes and supersensitizing agents.

SUMMARY OF THE INVENTION

Accordingly, an object of the present invention is to provide a novel methine compound.

Another object of the present invention is to provide a silver halide photographic material which contains a novel methine compound, has a high sensitivity and scarcely changes in sensitivity during storage under high temperature and/or high moisture conditions (namely, it is excellent in preservability over time).

Still another object of the present invention is to provide a silver halide photographic material containing a dye.

These and other objects of the present invention have been achieved by a methine compound represented by the following general formula (I) and a silver halide photographic material containing at least one compound represented by the following general formula (I):

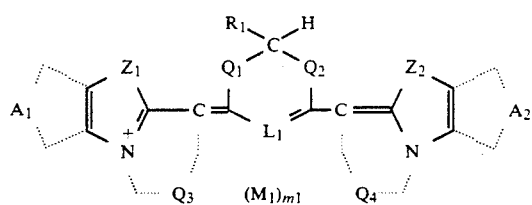

wherein $Z_1$ and $Z_2$ each represents an oxygen atom, a sulfur atom or a selenium atom; $R_1$ represents an alkyl group, an aryl group or a heterocyclic group; $Q_1$ and $Q_2$ each represents a methylene group; $Q_3$ and $Q_4$ each represents an atomic group required to form a five-membered, six-membered or seven-membered ring; $L_1$ represents a methine group; $A_1$ and $A_2$ each represents an atomic group required to form a benzene ring; $M_1$ represents a counter ion for neutralizing the electric charge of the compound; and $m_1$ represents the number required for neutralizing that electric charge.

DETAILED DESCRIPTION OF THE INVENTION

The compounds of general formula (I) are illustrated in more detail below.

The terms $Z_1$ and $Z_2$ each represents an oxygen atom, a sulfur atom or a selenium atom, with a sulfur atom being preferred.

Preferably, $R_1$ represents an alkyl group having 1 to 18 carbon atoms, preferably 1 to 7 carbon atoms, particularly preferably 1 to 4 carbon atoms (e.g., methyl, ethyl, propyl, isopropyl, butyl, isobutyl, hexyl, octyl, dodecyl, octadecyl), a substituted alkyl group [e.g., an aralkyl group (e.g., benzyl, 2-phenylethyl), a hydroxyalkyl group (e.g., 2-hydroxyethyl, 3-hydroxypropyl), a carboxyalkyl group (e.g., 2-carboxyethyl, 3-carboxypropyl, 4-carboxybutyl, carboxymethyl), an alkoxyalkyl group (e.g., 2-methoxyethyl, 2-(2-methoxyethoxy)ethyl), a sulfoalkyl group (e.g., 2-sulfoethyl, 3-sulfopropyl, 3-sulfobutyl, 4-sulfobutyl, 2-[3-sulfopropoxy]ethyl, 2-hydroxy-3-sulfopropyl, 3-sulfopropoxyethoxyethyl), a sulfato alkyl group (e.g., 3-sulfatopropyl, 4-sulfatobutyl), a heterocyclic group-substituted alkyl group (e.g., 2-(pyrrolidine-2-one-1-yl)ethyl, tetrahydrofurfuryl, 2-morpholinoethyl), 2-acetoxyethyl group, carbomethoxymethyl group, 2-methanesulfonylaminoethyl group], allyl group, an aryl group (e.g., phenyl, 2-naphthyl, 1-naphthyl), a substituted aryl group (e.g., 4-carboxyphenyl, 4-sulfophenyl, 3-chlorophenyl, 3-methylphenyl), a heterocyclic group (e.g., 2-pyridyl, 2-thiazolyl, 2-furyl, 2-thiophenyl) or a substituted heterocyclic group (e.g., 4-methyl-2-pyridyl, 4-phenyl-2-thiazolyl).

More preferably, $R_1$ is an unsubstituted alkyl group (e.g., methyl, ethyl, propyl, butyl, pentyl), an unsubstituted aryl group (e.g., phenyl, 1-naphthyl, 2-naphthyl) or an unsubstituted heterocyclic group (e.g., 2-pyridyl, 2-furyl).

Particularly preferably, $R_1$ is methyl group, ethyl group or phenyl group.

The terms $Q_1$ and $Q_2$ each represents a methylene group or a substituted methylene group [e.g., a methylene group substituted by one or more of a carboxyl group, a sulfo group, a cyano group, a halogen atom (e.g., fluorine, chlorine, bromine), a hydroxyl group, an alkoxycarbonyl group having not more than 8 carbon atoms (e.g., methoxycarbonyl, ethoxycarbonyl, phenoxycarbonyl, benzyloxycarbonyl), an alkoxy group having not more than 8 carbon atoms (e.g., methoxy, ethoxy, benzyloxy, phenethyloxy), a monocyclic aryloxy group having not more than 15 carbon atoms (e.g., phenoxy, p-tolyloxy), an acyloxy group having not more than 8 carbon atoms (e.g., acetyloxy, propionyloxy), an acyl group having not more than 8 carbon atoms (e.g., acetyl, propionyl, benzoyl), a carbamoyl group (e.g., carbamoyl, N,N-dimethylcarbamoyl, morpholinocarbonyl, piperidinocarbonyl), a sulfamoyl group (e.g., sulfamoyl, N,N-dimethylsulfamoyl, morpholinosulfonyl, piperidinosulfonyl) and an aryl group having not more than 15 carbon atoms (e.g., phenyl, 4-chlorophenyl, 4-methylphenyl, α-naphthyl)].

Preferably, $Q_1$ and $Q_2$ each is an unsubstituted methylene group.

The terms $Q_3$ and $Q_4$ each represents atomic groups required to form a five-membered, six-membered or seven-membered ring. Specifically, the atomic groups are carbon, nitrogen, oxygen and sulfur atoms. One or more substituent groups may be optionally attached to carbon and nitrogen atoms.

Examples of the substituent groups include a carboxyl group, a sulfo group, a cyano group, a halogen atom (e.g., fluorine, chlorine, bromine), a hydroxyl group, an alkoxycarbonyl group having not more than 8 carbon atoms (e.g., methoxycarbonyl, ethoxycarbonyl, phenoxycarbonyl, benzyloxycarbonyl), an alkoxy group having not more than 8 carbon atoms (e.g., methoxy, ethoxy, benzyloxy, phenethyloxy), a monocyclic aryloxy group having not more than 15 carbon atoms (e.g., phenoxy, p-tolyloxy), an acyloxy group having not more than 8 carbon atoms (e.g., acetyloxy, propionyloxy), an acyl group having not more than 8 carbon atoms (e.g., acetyl, propionyl, benzoyl), a carbamoyl group (e.g., carbamoyl, N,N-dimethylcarbamoyl, morpholinocarbonyl, piperidinocarbonyl), a sulfamoyl group (e.g., sulfamoyl, N,N-dimethylsulfamoyl, morpholinosulfonyl, piperidinosulfonyl) and an aryl group having not more than 15 carbon atoms (e.g., phenyl, 4-chlorophenyl, 4-methylphenyl, α-naphthyl).

Preferably, $Q_3$ and $Q_4$ are each the carbon atoms required for forming an unsubstituted five-membered, six-membered or seven-membered ring, and more preferably the carbon atoms required for forming a six-membered ring.

The benzene ring formed by $A_1$ and $A_2$ may be substituted by one or more of the following substituent groups: a halogen atom (e.g., fluorine, chlorine, fluorine), an unsubstituted alkyl group having not more than 10 carbon atoms (e.g., methyl, ethyl), a substituted alkyl group having not more than 18 carbon atoms (e.g., benzyl, α-naphthylmethyl, 2-phenylethyl, trifluoromethyl), an acyl group having not more than 8 carbon atoms (e.g., acetyl, benzoyl), an acyloxy group having not more than 8 carbon atoms (e.g., acetyloxy), an alkoxycarbonyl group having not more than 8 carbon atoms (e.g., methoxycarbonyl, ethoxycarbonyl, benzyloxycarbonyl), a carbamoyl group (e.g., carbamoyl, N,N-dimethylcarbamoyl, morpholinocarbonyl, piperidinocarbonyl), a sulfamoyl group (e.g., sulfamoyl, N,N-dimethylsulfamoyl, morpholinosulfonyl, piperidinosulfonyl), carboxyl group, cyano group, hydroxyl group, an amino group, an acylamino group having not more than 8 carbon atoms (e.g., acetylamino), a sulfonamido group having not more than 8 carbon atoms (e.g., benzenesulfonamido), an alkoxy group having not more than 10 carbon atoms (e.g., methoxy, ethoxy, benzyloxy), an alkylthio group having not more than 10 carbon atoms (e.g., ethylthio), an alkylsulfonyl group having not more than 5 carbon atoms (e.g., methylsulfonyl), sulfo group and an aryl group having not more than 15 carbon atoms (e.g., phenyl, tolyl). Substituent groups may be attached to adjoining carbon atoms in the benzene ring formed by $A_1$ and $A_2$ to form a benzene ring, or may be combined together to form a heterocyclic ring (e.g., pyrrole, thiophene, furan, pyridine, imidazole, triazole, thiazole).

The term $L_1$ represents a methine group or a substituted methine group [e.g., a methine group substituted by a substituted or unsubstituted alkyl group (e.g., methyl, ethyl, 2-carboxyethyl), a substituted or unsubstituted aryl group (e.g., phenyl, o-carboxyphenyl), a halogen atom (e.g., chlorine, bromine), an alkoxy group (e.g., methoxy, ethoxy) or an amino group (e.g., N,N-diphenylamino, N-methyl-N-phenylamino, N-methyl-piperadino)].

Preferably, $L_1$ is unsubstituted methine group.

$M_1$ and $m_1$ are included in the formula to show the presence or absence of a cation or an anion when it is necessary to neutralize the ionic electric charge of the dye. Whether a dye is cationic or anionic or has a net ionic charge varies depending on auxochrome and substituent groups. Typical examples of cations include an ammonium ion and alkali metal ions. Anions include inorganic anions and organic anions. Examples of the anions include halide ions (e.g., fluoride ion, chloride ion, bromide ion, iodide ion), substituted arylsulfonate ions (e.g., p-toluenesulfonate ion, p-chlorobenzenesulfonate ion), aryldisulfonate ions (e.g., 1,3-benzenedisulfonate ion, 1,5-naphthalenedisulfonate ion, 2,6-naphthalenedisulfonate ion), alkylsulfate ions (e.g., methylsulfate ion), a sulfate ion, a thiocyanate ion, a perchlorate ion, a tetrafluoroborate ion, a picrate ion, an acetate ion and a trifluoromethanesulfonate ion.

Among them, a perchlorate ion, an iodide ion and substituted arylsulfonate ions (e.g., p-toluenesulfonate ion) are preferred.

Specific examples of the dyes of general formula (I) according to the present invention include, but are not limited to, the following compounds.

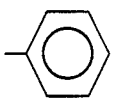

| Compound No. | $R_1$ | $n_1$ | $n_2$ | $V_2$ | $V_3$ | $V_6$ | $V_7$ | X | n |
|---|---|---|---|---|---|---|---|---|---|
| (1) | $CH_3$ | 3 | 3 | H | H | H | H | $ClO_4^-$ | 1 |
| (2) | 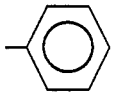 | 3 | 3 | H | H | H | H | $ClO_4^-$ | 1 |
| (3) | 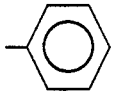 | 3 | 3 | H | H | H | H | $Br^-$ | 1 |
| (4) | 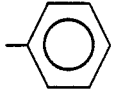 | 2 | 2 | H | H | H | H | $ClO_4^-$ | 1 |
| (5) | $CH_3$ | 2 | 2 | H | H | H | H | $I^-$ | 1 |
| (6) | 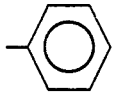 | 3 | 3 | $OCH_3$ | H | $OCH_3$ | H | $ClO_4^-$ | 1 |
| (7) | 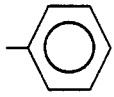 | 3 | 3 | H | Cl | H | Cl | $I^-$ | 1 |
| (8) |  | 3 | 3 | H | $SO_3^-$ | H | $SO_3^-$ | $Na^+$ | 1 |
| (9) | $CH_3$ | 2 | 3 | H | H | H | H | $Br^-$ | 1 |

-continued
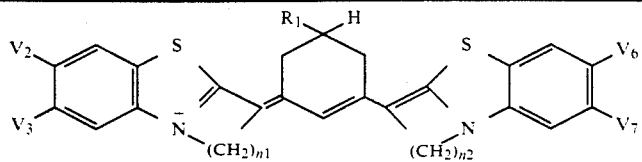
| Compound No. | $R_1$ | $n_1$ | $n_2$ | $V_2$ | $V_3$ | $V_6$ | $V_7$ | X | n |
|---|---|---|---|---|---|---|---|---|---|
| (10) | [phenyl] | 3 | 3 | H | H | H | H | $OCOCH_3^-$ | 1 |
(11) [structure with naphthyl S groups, Me, $CH_3C_6H_4SO_3^-$]
(12) [structure with Se, Ph, $Br^-$]
(13) [structure with O, Me, $ClO_4^-$]
(14) [structure with S, Ph, Cl, $I^-$]
(15) [structure with Se, Et, S, Cl, $ClO_4^-$]
(16) [structure with O, Ph, Se, $CH_3$, $CH_3$, $I^-$]

-continued

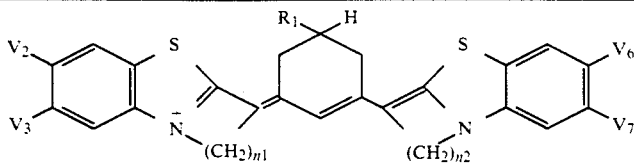

| Compound No. | $R_1$ | $n_1$ | $n_2$ | $V_2$ | $V_3$ | $V_6$ | $V_7$ | X | n |
|---|---|---|---|---|---|---|---|---|---|
| (17) | | | | | | | | | |
| (18) | | | | | | | | | |

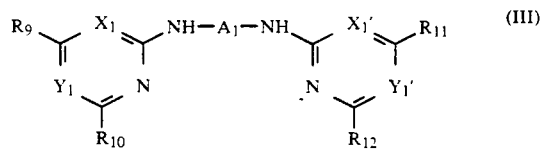

The compounds of general formula (I) (hereinafter referred to sometimes as methine compounds) which are used in the present invention can be synthesized by the methods described in *J. Am. Chem. Soc.*, Vol. 109, pp 5808–1813 (1987), *J. Org. Chem.*, Vol. 55, pp 49–57 (1990), *Prc. Blectrochem. Soc.*, Vol. 88, No. 14, pp. 97–104 (1988) and *Ukr. Khim. Zh.*, Vol. 41, No. 11, pp. 1165–1170 (1975).

The methine dyes of the present invention can be directly dispersed into photographic materials or a hydrophilic colloid solution. Alternatively, these dyes are dissolved in an appropriate solvent such as methyl alcohol, ethyl alcohol, propyl alcohol, methyl cellosolve, a halogenated alcohol (described in U.S. Pat. No. 3,756,830), acetone, water, pyridine or a mixture thereof, and the resulting solution is added to the photographic materials. Examples of other addition methods are described in JP-B-46-24185, U.S. Pat. Nos. 3,822,135, 3,660,101, 2,912,343, 2,996,287, 3,429,835 and 3,658,546. Further, the method described in West German Patent Application No. 2,104,283 and the method described in U.S. Pat. No. 3,649,286 can be used.

Further, the methine dyes of the present invention can be used as filter dyes, irradiation-preventing dyes or antihalation dyes to improve sharpness and color separation power.

The methine dyes can be contained in coating solutions for forming silver halide photographic layers, filter layers and/or antihalation layers by conventional methods. The dyes are used in a sufficient amount to color the photographic layers. The amount of the dye to be used can be properly determined by those skilled in the art, depending upon the object of using the dye. Generally, it is preferred that the dyes are used in such an amount as to give an optical density of 0.05 to 3.0, preferably 0.5 to 2.5.

The dye can be contained in a coating solution at any stage before coating the solution.

A polymer which has a charge opposite to the dye ion may coexist as a mordant in the layer with the dye, and the dye is localized in a specific layer by an interaction between the polymer and the dye molecule.

Examples of the polymer mordant include compounds described in U.S. Pat. Nos. 2,548,564, 4,124,386, 3,625,694, 3,958,995, 4,168,976 and 3,445,231.

In the sensitization of the present invention, supersensitization for M-band type sensitization can be carried out by using compounds represented by the following general formula (III), (IV), (V), (VI), (VIIa), (VIIb) or (VIIc) in particular.

The supersensitizing agents of general formula (III) are often effective when used in combination with the supersensitizing agents represented by the following general formulas (IV), (V), (VIIa), (VIIb) and (VIIc):

wherein $A_1$ represents a bivalent aromatic residue; $R_9$, $R_{10}$, $R_{11}$ and $R_{12}$ each represents a hydrogen atom, a hydroxyl group, an alkyl group, an alkoxy group, an aryloxy group, a halogen atom, a heterocyclic nucleus, a heterocyclic thio group, an arylthio group, an amino group, an alkylamino group, an arylamino group, an aralkylamino group, an aryl group or a mercapto group, each of which may be substituted; at least one of $A_1$, $R_9$, $R_{10}$, $R_{11}$ and $R_{12}$ is a group having sulfo group; $X_1$, $Y_1$, $X_1'$ and $Y_1'$ each represents —CH= or —N=, and at least one of $X_1$ and $Y_1$ and at least one of $X_1'$ and $Y_1'$ are —N=.

The compounds of general formula (III) are described in more detail below.

The group —$A_1$— represents a bivalent aromatic residue which may optionally have —$SO_3M$ group [wherein M is hydrogen atom or a cation (e.g., sodium, potassium) which makes the compound water-soluble].

A group selected from the group consisting of the following —A$_2$— or —A$_3$— is useful as —A$_1$—. However, when none of R$_9$, R$_{10}$, R$_{11}$ or R$_{12}$ has a —SO$_3$M group, —A$_1$— is selected from the group consisting of —A$_2$—.

—A$_2$—:
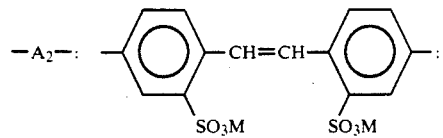

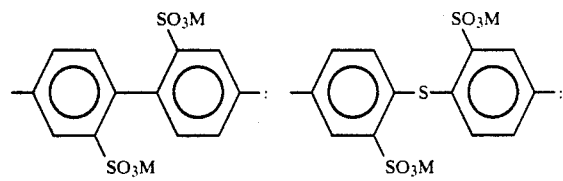

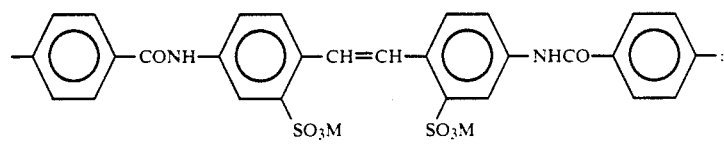

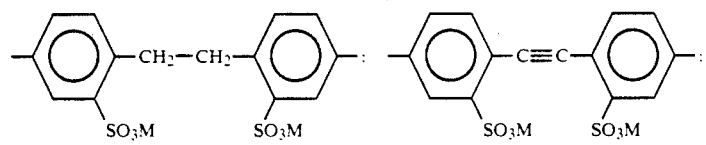

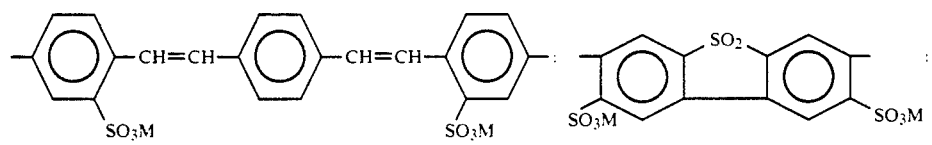

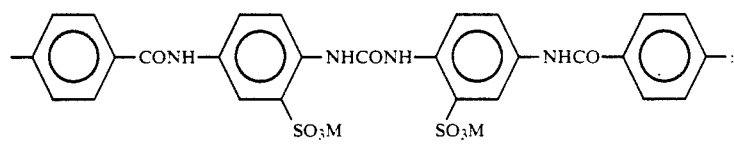

wherein M is hydrogen atom or a cation which makes the compound water-soluble,

—A$_3$—:

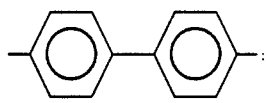

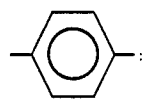

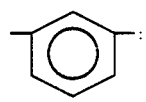

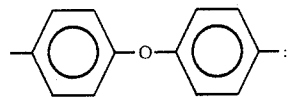

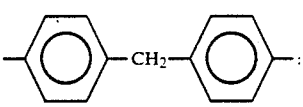

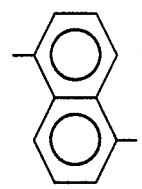

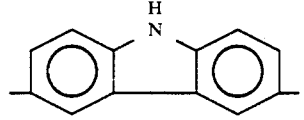

The terms R$_9$, R$_{10}$, R$_{11}$ and R$_{12}$ each represents a hydrogen atom, a hydroxyl group, an alkyl group (having preferably 1 to 8 carbon atoms, e.g., methyl, ethyl, n-propyl, n-butyl), an alkoxy group (having preferably 1 to 8 carbon atoms, e.g., methoxy, ethoxy, propoxy, butoxy), an aryloxy group (e.g., phenoxy, naphthoxy, o-tolyloxy, p-sulfophenoxy), a halogen atom (e.g., chlorine, bromine), a heterocyclic nucleus (e.g., morpholinyl, piperidyl), an alkylthio group (e.g., methylthio, ethylthio), a heterocyclic thio group (e.g., benzthiazolythio, benzimidazolythio, phenyltetrazolythio), an arylthio group (e.g., phenylthio, tolylthio), an amino group, an unsubstituted or substituted alkylamino group (e.g., methylamino, ethylamino, propylamino, dimethylamino, diethylamino, dodecylamino, cyclohexylamino, β-hydroxyethylamino, di(β-hydroxyethyl)amino, β-sulfoethylamino), an arylamino group or a substituted arylamino group (e.g., anilino, o-sulfoanilino, m-sulfoanilino, p-sulfoanilino, o-toluidino, m-toluidino, p-toluidino, o-carboxyanilino, m-carboxyanilino, p-carboxyanilino, o-chloroanilino, m-chloroanilino, p-chloroanilino, p-aminoanilino, o-anisidino, m-anisidino, p-anisidino, o-acetaminoanilino, hydroxyanilino, disulfophenylamino, naphthylamino, sulfonaphthylamino), a heterocyclic amino group (e.g., 2-benzthiazolylamino, 2-pyridylamino), a substituted or unsubstituted aralkylamino group (e.g., benzylamino, o-anisylamino, m-anisylamino,, p-anisylamino), an aryl group (e.g., phenyl) or a mercapto group.

The terms $R_9$, $R_{10}$, $R_{11}$ and $R_{12}$ may be the same or different. When $-A_1-$ is selected from the group consisting of $-A_3-$, it is necessary that at least one of $R_9$, $R_{10}$, $R_{11}$ and $R_{12}$ is a group having sulfo group (in the free form or in the form of a salt). $X_1$, $Y_1$, $X_1'$ and $Y_1'$ each represents $-CH=$ or $-N=$, preferably $X_1$ and $X_1'$ each is $-CH=$ and $Y_1$ and $Y_1'$ each is $-N=$.

Examples of the compounds of general formula (III) which can be used in the present invention include, but are not limited to, the following compounds:

(III-1) Disodium salt of 4,4'-bis[2,6-di-(2-naphthoxy)pyrimidine-4-ylamino]stilbene-2,2'-disulfonic acid
(III-2) Disodium salt of 4,4'-bis[2,6-di-(2-naphthylamino)pyrimidine-4-ylamino]stilbene-2,2'-disulfonic acid
(III-3) Disodium salt of 4,4'-bis(2,6-dianilinopyrimidine-4-ylamino)stilbene-2,2'-disulfonic acid
(III-4) Disodium salt of 4,4'-bis[2-(2-naphthylamino)-6-anilinopyrimidine-4-ylamino]stilbene-2,2'-disulfonic acid
(III-5) Ditriethylammonium salt of 4,4'-bis(2,6-diphenoxypyrimidine-4-ylamino)stilbene-2,2'-disulfonic acid
(III-6) Disodium salt of 4,4'-bis[2,6-di(benzimidazolyl-2-thio)pyrimidine-4-ylamino]stilbene-2,2'-disulfonic acid
(III-7) Disodium salt of 4,4'-bis[4,6-di(benzthiazolyl-2-thio)pyrimidine-2-ylamino]stilbene-2,2'-disulfonic acid
(III-8) Disodium salt of 4,4'-bis[4,6-di(benzthiazolyl-2-amino)pyrimidine-2-ylamino]stilbene-2,2'-disulfonic acid
(III-9) Disodium salt of 4,4'-bis[4,6-di(naphthyl-2-oxy)pyrimidine-2-ylamino]stilbene-2,2'-disulfonic acid
(III-10) Disodium salt of 4,4'-bis(4,6-diphenoxypyrimidine-2-ylamino)stilbene-2,2'-disulfonic acid
(III-11) Disodium salt of 4,4'-bis(4,6-diphenylthiopyrimidine-2-ylamino)stilbene-2,2'-disulfonic
(III-12) Disodium salt of 4,4'-bis(4,6-dimercaptopyrimidine-2-ylamino)biphenyl-2,2'-disulfonic acid
(III-13) Disodium salt of 4,4'-bis(4,6-dianilino-triazine-2-ylamino)stilbene-2,2'-disulfonic acid
(III-14) Disodium salt of 4,4'-bis(4-anilino-6-hydroxy-triazine-2-ylamin)stilbene-2,2'-disulfonic acid
(III-15) Disodium salt of 4,4'-bis[4,6-di(naphthyl-2-oxy)pyrimidine-2-ylamino]stilbene-2,2'-disulfonic acid
(III-16) Disodium salt of 4,4'-bis(4,6-dianilinopyrimidine-2-ylamino)stilbene-2,2'-disulfonic acid
(III-17) Disodium salt of 4,4'-bis[4-chloro-6-(2-naphthyloxy)pyrimidine-2-ylamino)biphenyl-2,2'-disulfonic acid
(III-18) Disodium salt of 4,4'-bis[4,6-di(1-phenyltetrazolyl-5-thio)pyrimidine-2-ylamino]stilbene-2,2'-disulfonic acid
(III-19) Disodium salt of 4,4'-bis[4,6-di(benzimidazolyl-2-thio)pyrimidine-2-ylamino]stilbene-2,2'-disulfonic acid
(III-20) Disodium salt of 4,4'-bis[4-naphthylamino-6-anilino-triazine-2-ylamino]stilbene-2,2'-disulfonic acid Among these compounds, (III-1) to (III-6), (III-9), (III-15) and (III-20) are preferred. Particularly preferred are (III-1), (III-2), (III-4), (III-5), (III-9), (III-15) and (III-20).

The compound of general formula (III) is used in an amount of 0.01 to 5 g per mol of silver halide in the emulsion and in a ratio by weight of the compound of general formula (III) to the sensitizing dye of from 1/1 to 100/1, preferably from 2/1 to 50/1. Further, it is preferred that the compounds of general formula (III) are used in combination with the compounds of general formula (IV).

The compounds of general formula (IV) are illustrated below:

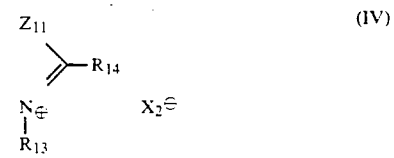

wherein $Z_{11}$ represents a non-metallic atomic group required for forming a five-membered or six-membered nitrogen containing heterocyclic ring. The ring may be condensed with a benzene ring or a naphthalene ring. Examples of the ring include thiazoliums [e.g., thiazolium, 4-methylthiazolium, benzthiazolium, 5-methylbenzthiazilium, 5-chlorobenzthiazolium, 5-methoxybenzthiazolium, 6-methylbenzthiazolium, 6-methoxybenzthiazolium, naphtho[1,2-d]thiazolium, naphtho[2,1-d]thiazolium], oxazoliums [e.g., oxazolium, 4-methyloxazolium, benzoxazolium, 5-chlorobenzoxazolium, 5-phenylbenzoxazolium, 5-methylbenzoxazolium, naphtho[1,2-d]oxazolium], imidazoliums [e.g., 1-methylbenzimidazolium, 1-propyl-5-chlorobenzimidazolium, 1-ethyl-5,6-dichlorobenzimidazolium, 1-allyl-5-trifluoromethyl-6-chlorobenzimidazolium) and selenazoliums [e.g., benzoselenazolium, 5-chlorobenzselenazolium, 5-methylbenzoselenazolium, 5-methoxybenzoselenazolium, naphtho-[1,2-d]selenazolium]. $R_{13}$ represents a hydrogen atom, an alkyl group (having preferably not more than 8 carbon atoms, e.g., methyl, ethyl, propyl, butyl, pentyl) or an alkenyl group (e.g., allyl group); $R_{14}$ represents a hydrogen atom or a lower alkyl group (e.g., methyl, ethyl) and $R_{13}$ and $R_{14}$ may be each a substituted alkyl group; and $X_2$ represents an acid anion (e.g., $Cl^-$, $Br^-$, $I^-$, $ClO_4^-$). Among the rings represented by $Z_{11}$, thiazoliums are preferred, and a substituted or unsubstituted benzthiazolium or naphthothiazolium is more preferred. These groups include not only unsubstituted groups but also optionally substituted groups.

Examples of the compounds of general formula (IV) include, but are not limited to, the following compounds.

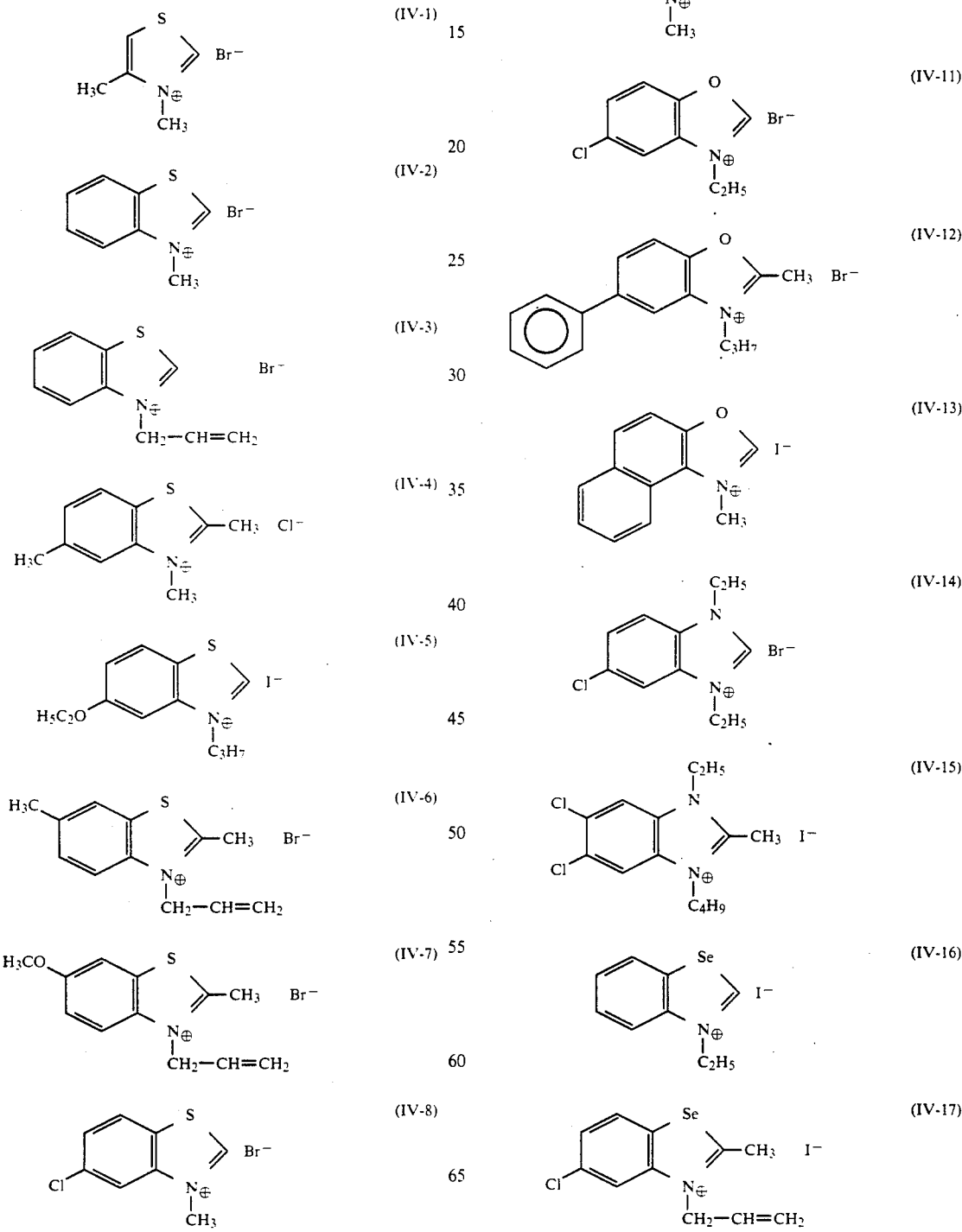

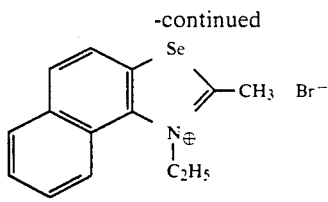 (IV-18)

The compound of general formula (IV) is used in an amount of 0.01 to 5 g per mol of silver halide in the emulsion.

Sensitizing dyes of general formula (I) and the compounds of general formula (IV) are used in a ratio by weight of the dye of general formula (I)/the compound of formula (IV) of preferably from 1/1 to 1/300, particularly preferably from ½ to 1/50.

The compounds of general formula (IV) can be directly dispersed into the emulsions. Alternatively, the compounds may be dissolved in an appropriate solvent (e.g., water, methyl alcohol, ethyl alcohol, propanol, methyl cellosolve, acetone) or a mixed solvent, and the resulting solution may be added to the emulsion. Further, the compounds as a dispersion thereof in a solution or colloid can be added to the emulsions as is true with the addition of other sensitizing dyes.

The compounds of general formula (IV) may be added to the emulsions before or after the addition of the sensitizing dyes of general formula (I). The compounds of general formula (IV) and the sensitizing dyes of general formula (I) may be separately dissolved, and the resulting solutions may be simultaneously added to the emulsions, or may be mixed and the mixture is then added to the emulsions.

It is preferred that a combination of the sensitizing dye of general formula (I) with the compound of general formula (IV) is used further in combination with the compound of general formula (III).

When a supersensitizing agent of general formula (III) or (IV) is used together with a heterocyclic mercapto compound in the sensitized emulsions of the present invention, sensitivity can be increased, and fogging can be prevented. Moreover, a latent image can be stabilized and the dependence of gradation on linear development can be greatly improved.

Examples of the heterocyclic mercapto compound include compounds formed by introducing a mercapto group into a heterocyclic compound having a thiazole ring, an oxazole ring, an oxazine ring, a thiazole ring, a thiazoline ring, a selenazole ring, an imidazole ring, an indoline ring, a pyrrolidine ring, a tetrazole ring, a thiazole ring, a quinoline ring or an oxadiazole ring. Compounds having carboxyl group, sulfo group, a carbamoyl group, a sulfamoyl group or hydroxyl group introduced thereinto are particularly preferred. It is disclose in the specification of JP-B-43-22883 that mercapto heterocyclic compounds are used as supersensitizing agents.

When the heterocyclic mercapto compounds are used in combination with the compounds of general formula (IV) in the present invention, a remarkable anti-fogging effect and a remarkable supersensitizing effect can be obtained. Among them, mercapto compounds represented by the following general formulas (V) and (VI) are particularly preferred:

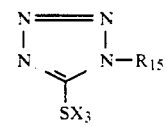 (V)

wherein $R_{15}$ represents an alkyl group, an alkenyl group or an aryl group; and $X_3$ represents a hydrogen atom, an alkali metal atom, an ammonium group or a precursor group. The alkali metal atom includes a sodium atom and a potassium atom. Examples of the ammonium group include a tetramethylammonium group and a trimethylbenzylammonium group. The term "precursor group" as used herein refers to group which is converted into H or an alkali metal upon elimination under alkaline conditions such as that of developing solution. Examples of the precursor group include an acetyl group, a cyanoethyl group and a methanesulfonylethyl group.

The alkyl group and the alkenyl group represented by $R_{15}$ include an unsubstituted group and a substituted group as well as an alicyclic group. Examples of the substituent groups for the substituted alkyl group include a halogen atom, a nitro group, a cyano group, a hydroxyl group, an alkoxy group, an aryl group, an acylamino group, an alkoxycarbonylamino group, a ureido group, an amino group, a heterocyclic group, an acyl group, a sulfamoyl group, a sulfonamido group, a thioureido group, a carbamoyl group, an alkylthio group, an arylthio group, a heterocyclic thio group, carboxyl group, a sulfo group and salts thereof.

Each of the above-described ureido, thioureido, sulfamoyl, carbamoyl and amino groups includes an unsubstituted group, an N-alkyl-substituted group and an N-aryl-substituted group. Examples of the aryl group include a phenyl group and a substituted phenyl group. Examples of substituent groups for the substituted phenyl group include an alkyl group and those already described above in the definition of the substituent groups for the alkyl group described herein before.

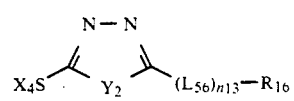 (VI)

wherein $Y_2$ represents an oxygen atom, a sulfur atom, =NH, or =N—$(L_{57})n_{14}$—$R_{17}$; $L_{56}$ and $L_{57}$ each represents a bivalent bonding group; $R_{16}$ and $R_{17}$ each represents a hydrogen atom, an alkyl group, an alkenyl group or an aryl group; the alkyl group, the alkenyl group and the aryl group represented by $R_{16}$ and $R_{17}$ are the same as those set forth in the definition of $R_{15}$ in general formula (V); and $X_4$ has the same meaning as $X_3$ in general formula (V).

Examples of the bivalent bonding group represented by $L_{56}$ and $L_{57}$ include

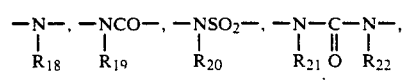

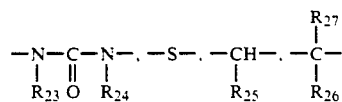

and combinations thereof.

$n_{13}$ and $n_{14}$ each represents 0 or 1. $R_{18}$, $R_{19}$, $R_{20}$, $R_{21}$, $R_{22}$, $R_{23}$, $R_{24}$, $R_{25}$ and $R_{26}$ each represents a hydrogen atom, an alkyl group or an aralkyl group.

The compounds are incorporated into one or more layers of the silver halide color photographic materials, that is, the sensitive and insensitive hydrophilic colloid layers.

The amounts of the compounds of general formula (V) or (VI) to be added are preferably $1 \times 10^{-5}$ to $5 \times 10^{-2}$ mol, more preferably $1 \times 10^{-4}$ to $1 \times 10^{-2}$ mol, per mol of silver halide when the compounds are contained in the silver halide color photographic materials. The compounds in an amount of about $1 \times 10^{-6}$ to about $1 \times 10^{-3}$ mol/l, preferably about $5 \times 10^{-6}$ to about $5 \times 10^{-4}$ mol/l as anti-fogging agents can be added to color developing solutions.

Preferred examples of the compounds of general formulas (V) and (VI) include, but are not limited to, compounds described at pages 4 to 8 in the specification of JP-A-62-269957. Among them, the following compounds are particularly preferred.

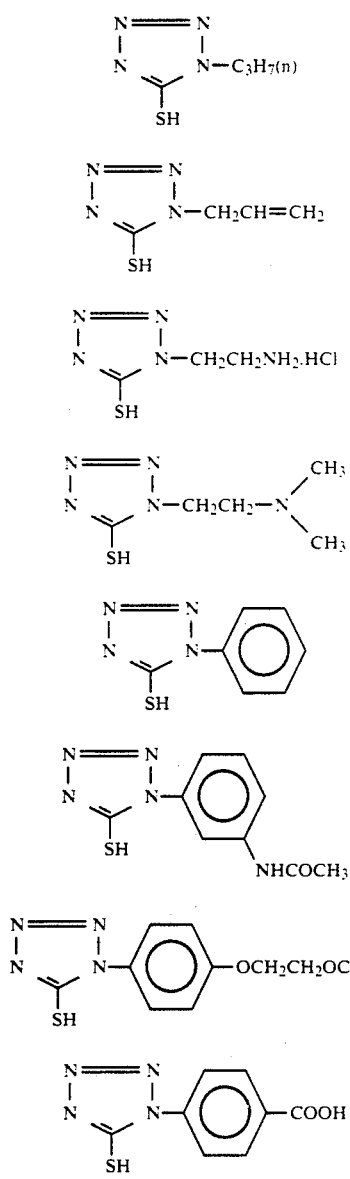

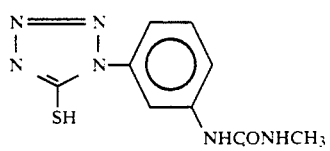

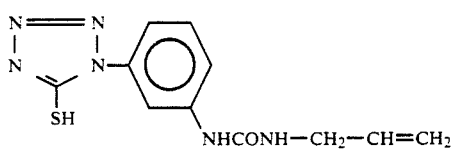

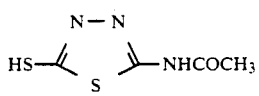

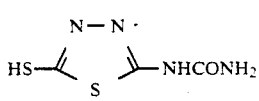

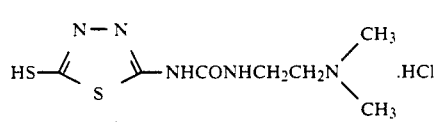

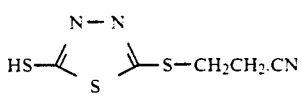

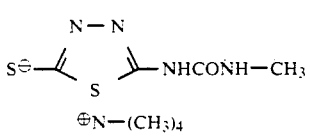

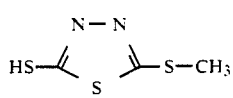

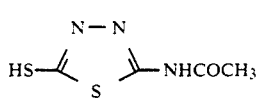

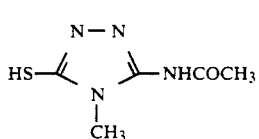

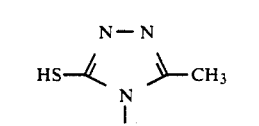

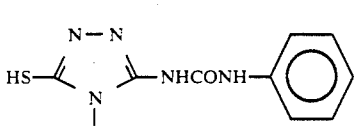

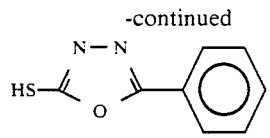 (VI-11)

Further, condensates having 2 to 10 condensation units of a substituted or unsubstituted polyhydroxybenzene and formaldehyde represented by the following general formulas (VIIa), (VIIb) and (VIIc) are useful as supersensitizing agents in carrying out sensitization on the material of the present invention. In addition to the supersensitization effect, the compounds also have the effect of preventing the latent image from being faded over time and the effect of preventing a lowering in gradation.

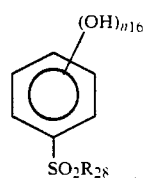 (VIIa)

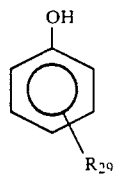 (VIIb)

(VIIc)

In the above formulas, $R_{27}$ and $R_{28}$ each represents OH, OM', $OR_{30}$, $NH_2$, $NHR_{30}$, $-N(R_{30})_2$, $-NHNH_2$ or $-NHNHR_{30}$; $R_{30}$ represents an alkyl group having 1 to 8 carbon atoms, ally group or an aralkyl group; M' represents an alkali metal or an alkaline earth metal; $R_{29}$ represents OH or a halogen atom; and $n_{15}$ and $n_{16}$ each represents 1, 2 or 3.

Examples of the substituted or unsubstituted polyhydroxybenzene as a condensation component of the aldehyde condensates which can be used in the present invention include, but are not limited to, the following compounds:

(VII-1) β-Resorcylic acid
(VII-2) γ-Resorcylic acid
(VII-3) 4-Hydroxybenzoic acid hydrazide
(VII-4) 3,5-Hydroxybenzoic acid hydrazide
(VII-5) p-Chlorophenol
(VII-6) Sodium hydroxybenzenesulfonate
(VII-7) p-Hydroxybenzoic acid
(VII-8) o-Hydroxybenzoic acid
(VII-9) m-Hydroxybenzoic acid
(VII-10) p-Dioxybenzene
(VII-11) Gallic acid
(VII-12) Methyl p-hydroxybenzoate
(VII-13) o-Hydroxybenzenesulfonamide
(VII-14) N-Ethyl-o-hydroxybenzoic acid amide (VII-14) N-Ethyl-o-hydroxybenzoic acid amide

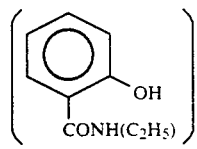

(VII-15) N-Diethyl-o-hydroxybenzoic acid amide

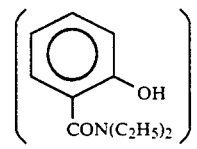

(VII-16) o-Hydroxybenzoic acid 2-methylhydrazide

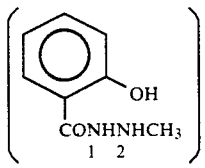

More specifically, the supersensitizing agents can be chosen from among compounds represented by general formulas (IIa), (IIb) and (IIc) described in JP-B-49-49504.

Any silver bromide, silver iodobromide, silver iodochlorobromide, silver chlorobromide and silver chloride can be used as silver halide for use in the silver halide photographic materials of the present invention. Preferred silver halides are the silver bromide, silver chlorobromide, silver iodobromide, silver iodochlorobromide and silver halide having high silver chloride content described in JP-A-2-42.

The constitution, processing, etc. of the photographic materials are illustrated below. Constitution and processing described in JP-A-2-42 can be preferably used for silver halide having high silver chloride content in particular. Constitution and processing described in JP-A-63-264743 can be preferably used for silver chlorobromide in particular.

The silver halide grains in the photographic materials may have a regular crystal form such as cube, tetradecahedron or rhombic dodecahedron, an irregular crystal form such as a sphere or a platy form, or a composite form of these crystal forms. A mixture of grains having various crystal forms may be used.

The silver halide photographic materials of the present invention may include an emulsion comprising tabular grains having a grain size distribution such that grains having a thickness of not larger than 0.5 μm, preferably not larger than 0.3 μm, a diameter of preferably not smaller than 0.6 μm, and an average aspect ratio of not lower than 5 account for at least 50% of the entire projected area of the entire grains. Further, the photographic materials may be prepared by using a monodisperse emulsion comprising grains having a grain size distribution such that grains having a grain size of within the mean grain size ±40% account for at least 90% of the number of grains.

Silver halide grains may comprise different phases in halogen composition between the interior of the grain and the surface layer thereof, or may be composed of a uniform phase. There may be used grains (e.g., negative type photographic material) wherein a latent image is predominantly formed on the surface of the grain; grains (e.g., internal latent image type photographic material) wherein a latent image is predominantly formed in the interior of the grain; or previously fogged grains (e.g., direct positive type photographic material).

The silver halide photographic materials having the above-described halogen compositions, crystal habits, grain structures, grain forms and grain size distribution are used in sensitive photographic elements for various uses. Accordingly, the methine dyes of the present invention are used as sensitizing agents, sensitizing dyes, filter dyes or dyes for antihalation or irradiation prevention in the photographic materials for uses described below. These dyes may be added to sensitive layers as well as to other layers such as interlayers, protective layers and back layers.

The methine dyes of the present invention are used in various color and black-and-white silver halide photographic materials.

More specifically, examples of the photographic materials in which the methine dyes of the present invention are contained include color positive photographic materials, color paper photographic materials, color negative photographic materials, reversal color photographic materials (containing couplers or no coupler), direct positive silver halide photographic materials, photographic materials for plate making (e.g., lith films, lith duplicating films), photographic materials for cathode ray tube display, photographic materials for X-ray recording (particularly photographic materials for direct or indirect photographing using a screen), photographic materials for use in silver salt diffusion transfer processes, photographic materials for use in color diffusion transfer processes, photographic materials for use in imbibition transfer processes, photographic materials for use in silver dye bleaching method and photographic materials for use in heat developing photosensitive materials.

Silver halide grains for use in the photographic materials of the present invention can be prepared by the methods described in P. Glafkides, *Chimie et Physique Photographique* (Paul Montel 1967), G. F. Duffin, *Photographic Emulsion Chemistry* (The Focal Press 1966) and V. L. Zelikman et al., *Making and Coating Photographic Emulsion* (The Focal Press 1964).

Ammonia, potassium rhodanide, ammonium rhodanide, thioether compounds (e.g., compounds described in U.S. Pat. Nos. 3,271,157, 3,574,628, 3,704,130, 4,297,439 and 4,276,374), thione compounds (e.g., compounds described in JP-A-53-144319, JP-A-53-82408 and JP-A-55-77737) and amine compounds (e.g., compounds described in JP-A-54-100717) can be used as solvents for silver halide during the course of the formation of silver halide grains to control the growth of the grains.

Cadmium salt, zinc salt, thallium salt, iridium salt or a complex salt thereof, rhodium salt or a complex salt thereof, or iron salt or a complex salt thereof may coexist during the course of the formation of the silver halide grains or the physical ripening thereof.

Examples of the internal latent image type photographic materials include conversion type photographic materials, core/shell type photographic materials and photographic materials containing a different kind of metal therein as described in U.S. Pat. Nos. 2,592,250, 3,206,313, 3,447,927, 3,761,276 and 3,935,014.

Silver halide grains in the silver halide photographic materials are generally chemically sensitized. Chemical sensitization methods which can be used include methods described in H. Frieser, *Die Grundlagen der Photographishen Prozesse mit Silberhalogeniden* (Akademishe Verlagsgesellschaft 1968), pp. 675–734.

Namely, sulfur sensitization method using sulfur-containing compounds capable of reacting with active gelatin or silver (e.g., thiosulfates, thioureas, mercapto compounds, rhodanine); selenium sensitization method; reduction sensitization methods using reducing substances (e.g., stannous salts, amines, hydrazine derivatives, formamidinesulfinic acid, silane compounds); and noble metal sensitization method using noble metal compounds (e.g., gold complex salts and other complex salts of Group VIII metals such as Pt, Ir and Pd) can be used singly or in combination.

The photographic materials of the present invention may contain various compounds to prevent fogging during the course of the preparation or storage of the photographic materials or during the processing thereof or to stabilize photographic performance. Examples of such compounds known as anti-fogging agents or stabilizers include thiazoles such as benzthiazolium salts described in U.S. Pat. Nos. 3,954,478 and 4,942,721 and JP-A-59-191032; ring opening products, nitroindazoles, triazoles, benztriazoles and benzimidazoles (particularly nitro- or halogen-substituted products) described in JP-B-59-26731; heterocyclic mercapto compounds such as mercaptothiazoles, mercaptobenzthiazoles, mercaptobenzimidazoles, mercaptothiadiazoles, mercaptotetrazoles (particularly, 1-phenyl-5-mercaptotetrazole) and mercaptopyrimidines; the above-described heterocyclic mercapto compounds having a water-soluble group such as carboxyl group or sulfo group; thioketone compounds such as oxazolinethione; azaindenes such as tetrazaindenes (particularly 4-hydroxy-substituted (1,3,3a,7)tetrazaindenes); benzenethiosulfonic acids; and benzenesulfinic acid.

The silver halide photographic materials of the present invention can contain color couplers such as cyan couplers, magenta couplers and yellow couplers and compounds for dispersing the couplers.

Namely, the silver halide photographic materials may contain compounds which form a color by the oxidative coupling thereof with aromatic primary amine developing agents (e.g., phenylenediamine derivatives, aminophenol derivatives) during color development. Magenta couplers include 5-pyrazolone couplers, pyrazolobenzimidazole couplers, cyanoacetylcoumarone couplers and open chain acylacetonitrile couplers. Yellow couplers include acylacetamide couplers (e.g., benzoylacetanilides, pivaloylacetanilides). Cyan couplers include naphthol couplers and phenol couplers. It is preferred that these couplers have nondiffusing couplers having a hydrophobic group called a ballast group in the molecule. The couplers may be either four equivalent type and two equivalent type to silver ion. Colored couplers having the effect of correcting color and couplers which release a development inhibitor during development (called DIR coupler) may be used.

In addition to a DIR coupler, the photographic materials may contain non-color forming DIR coupling compounds which release a development inhibitor and whose coupling reaction product is colorless.

The photographic materials of the present invention may contain polyalkylene oxides or ether, ester or amine derivatives thereof, thioether compounds, thiomorpholines, quaternary ammonium salt compounds, urethane derivatives, urea derivatives, imidazole derivatives and 3-pyrazolidones to increase sensitivity or contrast or to accelerate development.

The silver halide photographic materials of the present invention may contain various dyes as filter dyes or to prevent irradiation.

Examples of such dyes include oxonol dyes having a pyrazolone nucleus or a barbituric acid nucleus described in U.K. Patents 506,385, 1,177,429, 1,311,884, 1,338,799, 1,385,371, 1,467,214, 1,433,102 and 1,553,516, JP-A-48-85130, JP-A-49-114420, JP-A-52-117123, JP-A-55-161233, JP-A-59-111640, JP-B-39-22069, JP-B-43-13168, JP-B-62-273527, U.S. Pat. Nos. 3,247,127, 3,469,985 and 4,078,933; other oxonol dyes described in U.S. Pat. Nos. 2,533,472 and 3,379,533, U.K. Patent 1,278,621, JP-A-1-134447 and JP-A-1-183652; azo dyes described in U.K. Patents 575,691, 680,631, 599,623, 786,907, 907,125 and 1,045,609, U.S. Pat. No. 4,255,326 and JP-A-59-211043; azomethine dyes described in JP-A-50-100116, JP-A-54-118247, U.K. Patents 2,014,598 and 750,031; anthraquinone dyes described in U.S. Pat. No. 2,865,752; arylidene dyes described in U.S. Pat. Nos. 2,538,009, 2,688,541 and 2,538,008, U.K. Patents 584,609 and 1,210,252, JP-A-50-40625, JP-A-51-3623, JP-A-51-10927, JP-A-54-118247, JP-B-48-3286 and JP-B-59-37303; styryl dyes described in JP-B-28-3082, JP-B-44-16594 and JP-B-59-28898; triarylmethane dyes described in U.K. Patents 446,583 and 1,335,422 and JP-A-59-228250; merocyanine dyes described in U.K. Patents 1,075,653, 1,153,341, 1,284,730, 1,475,228 and 1,542,807; and cyanine dyes described in U.S. Pat. Nos. 2,843,486 and 3,294,539 and JP-A-1-291247.

The following methods can be used to prevent these dyes from diffusing.

Methods wherein a hydrophilic polymer having a charge oppose to the dissociated anionic dye coexists as a mordant in a layer and the dye is localized in a specific layer by an interaction between the polymer and the dye molecule, are disclosed in U.S. Pat. Nos. 2,548,564, 4,124,386 and 3,625,694.

Methods wherein a specific layer is dyed by using a water-insoluble dye solid are disclosed in JP-A-56-12639, JP-A-55-155350, JP-A-55-155351, JP-A-63-27838, JP-A-63-197943 and European Patent 15,601.

Methods wherein a specific layer is dyed by using fine metal salt particles containing a dye adsorbed thereon are disclosed in U.S. Pat. Nos. 2,719,088, 2,496,841 and 2,496,843 and JP-A-60-45237.

The photographic materials of the present invention may contain various surfactants as coating aids or to impart antistatic properties, improve slipperiness, emulsifying dispersion or photographic characteristics (e.g., development acceleration, high contrast, sensitization) and to prevent sticking.

In the practice of the present invention, other additives are used together with hydrophilic colloid in the photographic materials. Examples of such additives include antifading agents, inorganic or organic hardening agents, color fogging inhibitors, ultraviolet light absorbers, mordants, plasticizers, latex polymers and matting agents. Examples thereof are described, in *Research Disclosure*, Vol. 176 (1978, XI), D-17643.

Hydrophilic polymers such as gelatin as protective colloid are used in the photographic materials of the present invention.

A finished photographic material can be obtained by coating layers on a suitable support such as baryta paper, resin-coated paper, synthetic paper, cellulose triacetate film, polyethylene terephthalate film, other plastic bases or a glass sheet.

Exposure for obtaining a photographic image may be conducted by conventional methods. Any conventional light source such as natural light (sunlight), a tungsten lamp, a fluorescent lamp, a mercury lamp, a xenon arc lamp, a carbon arc lamp, a xenon flash lamp and a cathode ray tube flying spot can be used. Exposure time is 1/1000 to one second for conventional cameras. However, an exposure time shorter than 1/1000 seconds can be used. For example, when a xenon flash lamp or a cathode ray tube is used, an exposure time of $1/10^4$ to $1/10^6$ seconds can be used. If desired, exposure time longer than one second can be used. If desired, the spectral composition of light for use in conducting exposure can be controlled by a color filter. Exposure may be conducted by a laser beam. Further, exposure may be carried out by light emitted from phosphors excited by an electron beam, X-rays, $\gamma$-rays or $\alpha$-rays.

The photographic materials of the present invention can be processed by the conventional methods and conventional processing solutions described in *Research Disclosure* No. 176, pp. 28-30 (RD-17643). Photographic processing may be photographic processing for forming a silver image (black-and-white photographic processing) and photographic processing for forming a dye image (color photographic processing) according to the purpose. Processing temperature is generally in the range of 18° to 50° C. However, a temperature lower than 18° C. or higher than 50° C. may be used.

The present invention is now illustrated in greater detail by reference to the following examples which, however, are not to be construed as limiting the invention in any way.

EXAMPLE 1

Synthesis of Compound (1):

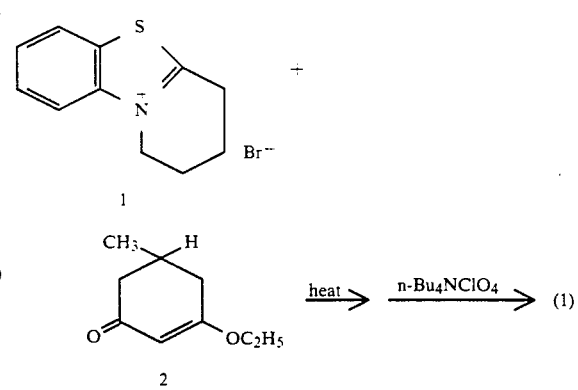

2.7 g of compound 1 and 1 g of compound 2 were heated at 140° C. and stirred for one hour. After the reaction mixture (solution) was cooled, 200 ml of a methanol solution of one g of n-tetrabutylammonium perchlorate was added thereto, and the precipitated crystal was collected by filtration. The crystal was completely dissolved in a chloroform-methanol mixed solvent, and chloroform was then distilled off to obtain 0.4 g of the desired Compound (1) as a blue crystal.

Yield: 14%
$\lambda_{max}{}^{MeOH} = 669.1$ nm
$\epsilon = 1.93 \times 10^5$
m.p.: 275° C.

EXAMPLE 2

Synthesis of Compound (2):

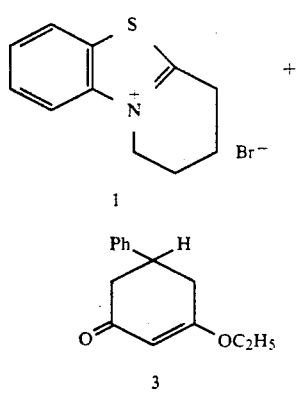

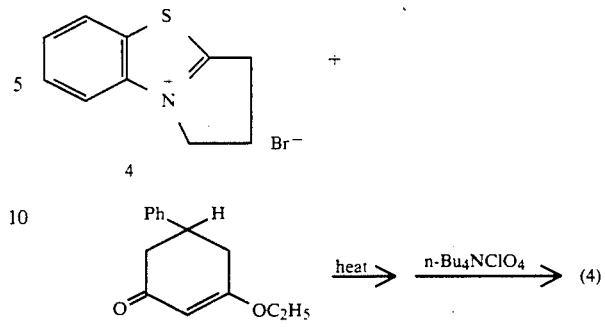

2.4 g of compound 1 and 1.6 g of compound 3 were heated at 140° C. and stirred for one hour. After the reaction mixture (solution) was cooled, 50 ml of a methanol solution of 2.0 g of n-tetrabutylammonium perchlorate was added thereto, and the precipitated solid was collected by filtration. The solid was completely dissolved in a chloroform-methanol mixed solvent, and chloroform was then distilled off (repeated twice) to obtain 0.9 g of the desired Compound (2) as a blue crystal.

Yield: 31%
$\lambda_{max}{}^{MeOH} = 671.4$ nm
$\epsilon = 1.80 \times 10^5$
m.p.: 220°–222° C.

EXAMPLE 3

Synthesis of Compound (3):

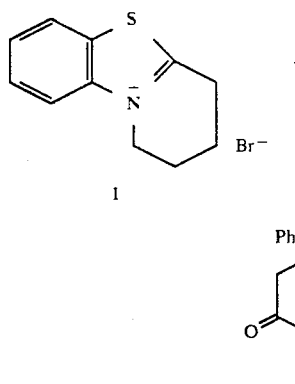

2.4 g of compound 1 and 1.0 g of compound 3 were heated at 140° C. and stirred for one hour. After the reaction mixture (solution) was cooled, the Compound (3) was purified by means of silica gel column chromatography, and completely dissolved in a chloroform-ethanol mixed solvent. Chloroform was then distilled off to obtain 0.7 g of the desired Compound (3).

Yield 25%
$\lambda_{max}{}^{MeOH} = 671.0$ nm
$\epsilon = 1.85 \times 10^5$
m.p.: 221°–225° C. (decomp.)

EXAMPLE 4

Synthesis of Compound (4):

2.3 g of compound 4 and 1.0 g of compound 3 were heated at 160° C. and stirred for 1.5 hours. After the reaction mixture (solution) was cooled, 200 ml of a methanol solution of 1.0 g of n-tetrabutylammonium perchlorate was added thereto, and the precipitated crystal was collected by filtration. The crystal was completely dissolved in a chloroform-methanol mixed solvent, and chloroform was then distilled off to obtain 0.2 g of the desired Compound (4) as a bluish black crystal.

Yield: 7%
$\lambda_{max}{}^{MeOH} = 665.1$ nm
$\epsilon = 1.93 \times 10^5$
m.p.: 238°–242° C.

EXAMPLE 5

Synthesis of Compound (10):

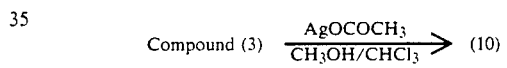

One hundred sixty mg of silver acetate (I) was added to 100 ml of a methanol-chloroform (1:1) mixed solution of 80 mg of Compound (3), and the mixture was stirred at room temperature for one hour. The formed silver bromide was collected by filtration. The filtrate was distilled under reduced pressure and purified twice through Sephadex column to obtain 55 mg of the desired Compound (10).

Yield: 71%
$\lambda_{max}{}^{MeOH} = 671.0$ nm
$\epsilon = 1.65 \times 10^5$
m.p.: 198°–205° C.

EXAMPLE 6

One thousand ml of water, 30 g of deionized ossein gelatin and 2.81 g of sodium chloride were added to a reactor. While the temperature was kept at 60° C., 23.5 ml of 1N sulfuric acid was added thereto with stirring. Subsequently, a 0.210N aqueous solution of silver nitrate and a 0.210N aqueous solution of sodium chloride were added thereto at a constant flow rate of 4.38 ml/min over a period of 40 minutes. Ten minutes after the completion of the addition, a 2.206N aqueous solution of silver nitrate and a 2.206N aqueous solution of sodium chloride were added thereto at a constant flow rate of 5.00 ml/min over a period of 80 minutes. A high-molecular copolymer of isobutene and monosodium maleate as a coagulant was added to the resulting silver chloride emulsion. The precipitated silver chloride grains were washed with water and desalted. Deionized ossein gelatin and water was added to the grains, the pH was adjusted to 6.3 and the pAg was adjusted to 7.4 at 40° C. Silver chloride grains in the thus-prepared emulsion were in a monodisperse cube form having an average side length of 0.73 μm and a coefficient of variation of 6.5% (a value obtained by dividing standard deviation by average side length: s/d).

Triethylurea was added to the emulsion, the emulsion was ripened at 50° C. to make sulfur sensitization.

The emulsion was divided into portions, and the sensitizing dye of the present invention, etc. were added thereto at 40° C. as indicated in Table 1 (A, C and D being described hereinbefore). Subsequently, 0.18 g of 4-hydroxy-6-methyl-1,3,3a,7-tetrazaindene, 280 g of a 10% gel of deionized gelatin and 1.04 l of water were added to each of these emulsions, each amount being per kg of the emulsion. Each emulsion was coated on a cellulose triacetate film base in the following manner.

| Metol (i.e., 4-Methylamino-phenol sulfate) | 2.5 g |
| L-ascorbic acid | 10.0 g |
| Potassium bromide | 1.0 g |
| Nabox (manufactured by Fuji Photo Film Co., Ltd.) | 35.0 g |
| Water to make | 1000 ml |
| pH (20° C.) | 9.8 |

The standard point of optical density for determining sensitivity is the point of a density of (Fog +0.2). The reciprocal of exposure amount giving said density is referred to as sensitivity. Relative sensitivity given in Table 1 is represented by relative value when the sensitivity of the sample containing $2.5 \times 10^{-5}$ mol of comparative sensitizing dye A per mol of silver stored in the refrigerator is referred to as 100.

TABLE 1

| Sample No. | Sensitizing dye and amount added ($\times 10^{-5}$ mol/mol of Ag) | | Compound used in combination and amount added ($\times 10^{-4}$ mol/mol of Ag) | | Sample stored in refrigerator | | Sample stored at 50° C., 75% RH | | Remarks |
|---|---|---|---|---|---|---|---|---|---|
| | | | | | fog | relative sensitivity | fog | relative sensitivity | |
| 1-1 | A | 2.5 | — | | 0.04 | 100 (standard) | 0.07 | 43 | Comparison |
| 1-2 | | 5.0 | — | | 0.05 | 129 | 0.17 | 49 | " |
| 1-3 | | 10.0 | — | | 0.06 | 95 | 0.24 | 47 | " |
| 1-4 | | 10.0 | IV-3 | 5.0 | 0.05 | 209 | 0.12 | 132 | " |
| 1-5 | C | 2.5 | — | | 0.05 | 115 | 0.11 | 45 | " |
| 1-6 | | 5.0 | — | | 0.05 | 151 | 0.23 | 42 | " |
| 1-7 | | 10.0 | — | | 0.07 | 117 | 0.29 | 62 | " |
| 1-8 | | 10.0 | IV-5 | 4.0 | 0.05 | 302 | 0.17 | 162 | " |
| 1-9 | D | 2.5 | — | | 0.06 | 102 | 0.09 | 47 | " |
| 1-10 | | 5.0 | — | | 0.07 | 123 | 0.19 | 69 | " |
| 1-11 | | 10.0 | — | | 0.08 | 87 | 0.26 | 66 | " |
| 1-12 | | 10.0 | V-6 | 5.0 | 0.06 | 191 | 0.14 | 141 | " |
| 1-13 | (1) | 2.5 | — | | 0.05 | 110 | 0.05 | 68 | Invention |
| 1-14 | | 5.0 | — | | 0.05 | 155 | 0.07 | 117 | " |
| 1-15 | | 10.0 | — | | 0.06 | 129 | 0.08 | 123 | " |
| 1-16 | | 10.0 | VI-5 | 4.0 | 0.04 | 389 | 0.05 | 347 | " |
| 1-17 | (2) | 2.5 | — | | 0.04 | 145 | 0.06 | 98 | " |
| 1-18 | | 5.0 | — | | 0.04 | 162 | 0.07 | 138 | " |
| 1-19 | | 10.0 | — | | 0.05 | 85 | 0.08 | 89 | " |
| 1-20 | | 10.0 | IV-3 | 5.0 | 0.04 | 195 | 0.06 | 209 | " |
| 1-21 | | 10.0 | V-6 | 5.0 | 0.04 | 214 | 0.05 | 200 | " |

The amount of the coating solution was set so as to give 2.5 g of silver/m² and 3.8 g of gelatin/m². An aqueous solution mainly comprising 0.1 g of sodium dodecylbenzenesulfonate, 0.22 g/l of p-sulfostyrene sodium homopolymer, 3.1 g/l of sodium salt of 2-hydroxy-4,6-dichloro-1,3,5-triazine and 50 g/l of gelatin was simultaneously coated as an upper layer in such an amount as to give 1.0 g of gelatin/m².

Each of these samples was divided into two portions. One of them was stored at 50° C. and 75% RH for three days, and the other was stored in a refrigerator at −20° C. for the same period of time. These coated samples were exposed to a tungsten light source (color temperature: 2854° K.) through red sharp cut filter (a filter which allow light having a wavelength longer than about 640 nm to be transmitted; manufactured by Fuji Photo Film Co., Ltd.) and a continuous wedge.

The exposed samples were developed with a developing solution having the following composition at 20° C. for 10 minutes. The development was stopped, and the samples were fixed and washed with water. The density of each sample was measured by using P type densitometer manufactured by Fuji Photo Film Co., Ltd. to determine the values of red filter sensitivity (SR) and fog.

As shown in Table 1, sensitivity is not so high in comparison with known comparative compounds. But when samples are stored under high temperature and humidity conditions, comparative compounds cause a great lowering in sensitivity and an increase in fog, while the novel sensitizing dyes of the present invention cause scarcely any lowering in sensitivity or an increase in fog. When the compounds of the present invention are used in combination with the supersensitizing agents having a supersensitization effect, sensitivity is remarkably increased. In addition thereto, even when stored under high temperature and humidity conditions, sensitivity is substantially retained and it is found that fog is scarcely increased.

EXAMPLE 7

One thousand ml of water, 20 g of deionized ossein gelatin and 0.4 g of potassium bromide were added to a reactor. While the temperature was kept at 60° C., 36 ml of a 0.47N aqueous solution of silver nitrate and 36 ml of a 0.477N aqueous solution of potassium bromide were added thereto over a period of one minute. Subsequently, 14 ml of a 50% aqueous ammonium nitrate solution and 6 ml of a 25% aqueous ammonia solution were added thereto. After 4 minutes, 1 liter of a 1.18N aqueous solution of silver nitrate and 1 liter of a 1.30N aqueous solution of potassium bromide were added thereto over a period of 50 minutes while the silver potential in the reactor was kept at +50 mV against saturated calomel electrode. A high-molecular coagulant composed of a copolymer of isobutene with monosodium maleate was added thereto. The precipitated silver bromide grains were washed with water and desalted. Deionized ossein gelatin and water was added thereto, pH was adjusted to 6.3 and pAg was adjusted to 8.5 at 40° C. Silver bromide grains in the emulsion were in monodisperse cube form having an average side length of 0.77 μm (a coefficient of variation: 10.8%). Sodium thiosulfate was added to the emulsion, the emulsion was ripened at 50° C. to conduct sulfur sensitization.

Separately, 10.0 g of cyan coupler (a) and 5.6 g of dye image stabilizer (b) were dissolved in 11.5 ml of ethyl acetate and 7.7 ml of biscyclohexyl phthalate. The resulting solution was emulsified and dispersed in 150 ml of a 10% aqueous gelatin solution containing 10 ml of 10% sodium dodecylbenzenesulfonate.

The silver bromide emulsion prepared above was divided into portions. Compounds given in Table 2 were added thereto at 40° C. After 20 minutes, 138.9 g (in terms of coupler per mol silver) of the above emulsified dispersion was added thereto, and then $3.0 \times 10^{-4}$ mol (per mol of silver) of 1-(3-acetylaminophenyl)-5-mercaptotetrazole was added thereto to prepare the samples given in Table 2.

A paper support (both sides being laminated with polyethylene) was used as a support. The amounts of the coating solution were set so as to give 0.35 g of silver/m² and 1.50 g of gelatin/m². A protective layer comprising gelatin (1.50 g/m²) was provided as an upper layer. Sodium salt of 2-hydroxy-4,6-dichloro-1,3,5-triazine was used as a hardening agent in each layer.

Cyan coupler (a)

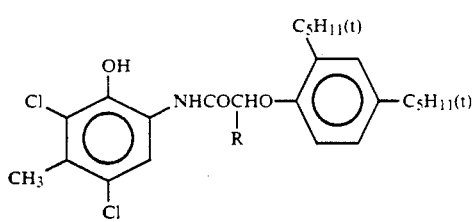

R = C₂H₅ and C₄H₉ and

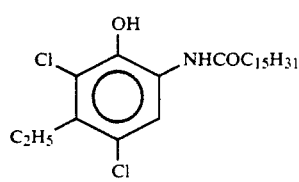

2:4:4 (by weight) mixture

Dye image stabilizer (b)

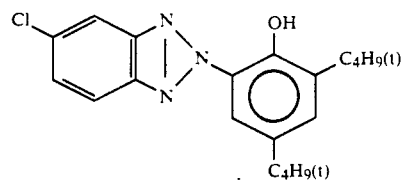

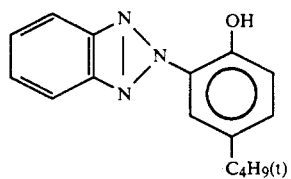

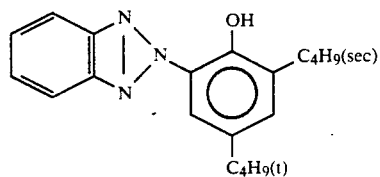

2:4:4 (by weight) mixture

Each of these samples was divided into two portions. One of them was stored at 50° C. and 80% RH for 3 days, and the other was stored in a refrigerator at −20° C. for the same period of time. These samples were exposed to a tungesten light source (color temperature: 2854° K.) through a red sharp cut filter SC 66 (a filter which allows light having a wavelength longer than about 640 nm to be transmitted; manufactured by Fuji Photo Film Co., Ltd.) and a continuous wedge.

The exposed samples were color-developed in the following stages:

| Processing Stage | Temp. | Time | Replenishment rate* | Tank capacity |
|---|---|---|---|---|
| Color development | 35° C. | 45 sec | 161 ml | 17 l |
| Bleaching-fixing | 30~35° C. | 45 sec. | 215 ml | 17 l |
| Rinse (1) | 30~35° C. | 20 sec. | — | 10 l |
| Rinse (2) | 30~35° C. | 20 sec. | — | 10 l |
| Rinse (3) | 30~35° C. | 20 sec. | 350 ml | 10 l |
| Drying | 70~80° C. | 60 sec. | | |

A three tank countercurrent system of rinse (3) → rinse (1) was used.
*Replenishment rate being per m² of photographic material.

Each processing solution had the following composition:

| Color developing solution | | |
|---|---|---|
| | Tank Solution | Replenisher |
| Water | 800 ml | 800 ml |
| Ethylenediamine-N,N,N,N-tetramethylanephosphonic acid | 1.5 g | 2.0 g |
| Triethanolamine | 8.0 g | 12.0 g |
| Sodium chloride | 1.4 g | — |
| Potassium carbonate | 25.0 g | 25.0 g |
| N-Ethyl-N-(β-methanesulfonamidoethyl)-3-methyl-4-aminoaniline sulfate | 5.0 g | 7.0 g |
| N,N-Bis(carboxymethyl)-hydrazine | 5.5 g | 7.0 g |
| Brightening agent (WHITEX | 1.0 g | 2.0 g |

| -continued | | |
|---|---|---|
| 4B, a product of Sumitomo Chemical Industries, Ltd.) | | |
| Water to make | 1000 ml | 1000 ml |
| pH (25° C.) | 10.05 | 10.45 |

Bleaching-fixing solution
(Tank solution and replenisher being the same)

| Water | 800 ml |
|---|---|
| Ammonium thiosulfate (70%) | 100 ml |
| Sodium sulfite | 17 g |
| Ammonium ethylenediaminetetraacetato ferrate | 55 g |
| Disodium ethylenediaminetetraacetate | 5 g |
| Ammonium bromide | 40 g |
| Water to make | 1000 ml |
| pH (25° C.) | 6.0 |

Rinsing solution (Tank solution and replenisher being the same)

Ion-exchanged water (the concentration of each of magnesium and calcium being reduced to not higher than 3 ppm).

The evaluation of photographic characteristics was made in the following manner.

The density of developed yellow color through a blue filter, the density of developed magenta color through a green filter and the density of developed cyan color through a red filter were measured by a P type densitometer manufactured by Fuji Photo Film Co., Ltd. to determine the values of sensitivity and fog. The standard point of optical density for determining sensitivity is a point of a density of (Fog+0.5). The reciprocal of the exposure rate giving that density is referred to as sensitivity. With regard to Sample Nos. 2-1, to 2-13, the relative sensitivity given in Table 2 is represented by the relative value when the sensitivity of the Sample No. 2-1 stored in the refrigerator is referred to as 100. With regard to sample Nos. 2-14 to 2-21, the relative sensitivity is represented by the relative value when the sensitivity of the sample No. 2-14 stored in the refrigerator is referred to as 100.

TABLE 2

| Sample No. | Sensitizing dye and amount added ($\times 10^{-5}$ mol/mol of Ag) | | Compound used in combination and amount added ($\times 10^{-4}$ mol/mol of Ag) | | Sample stored in refrigerator | | Sample stored at 50° C., 80% RH | | Remarks |
|---|---|---|---|---|---|---|---|---|---|
| | | | | | fog | relative sensitivity | fog | relative sensitivity | |
| 2-1 | B | 2.5 | — | | 0.06 | 100 (standard) | 0.12 | 41 | comparison |
| 2-2 | | 5.0 | — | | 0.07 | 120 | 0.21 | 40 | " |
| 2-3 | | 10.0 | — | | 0.11 | 105 | 0.27 | 51 | " |
| 2-4 | | 10.0 | III-1 | 9.0 | 0.08 | 234 | 0.22 | 100 | " |
| 2-5 | | 10.0 | VII-7 | 10.0 | 0.07 | 162 | 0.21 | 66 | " |
| 2-6 | (3) | 2.5 | — | | 0.05 | 120 | 0.06 | 78 | invention |
| 2-7 | | 5.0 | — | | 0.06 | 148 | 0.08 | 126 | " |
| 2-8 | | 10.0 | — | | 0.06 | 129 | 0.08 | 123 | " |
| 2-9 | | 10.0 | III-1 | 9.0 | 0.04 | 302 | 0.06 | 240 | " |
| 2-10 | (4) | 2.5 | — | | 0.05 | 132 | 0.06 | 100 | " |
| 2-11 | | 5.0 | — | | 0.05 | 155 | 0.06 | 145 | " |
| 2-12 | | 10.0 | — | | 0.06 | 102 | 0.07 | 95 | " |
| 2-13 | | 10.0 | VII-7 | 10.0 | 0.04 | 204 | 0.05 | 170 | " |
| 2-14 | E | 2.5 | — | | 0.08 | 100 (standard) | 0.18 | 46 | comparison |
| 2-15 | | 5.0 | — | | 0.11 | 129 | 0.27 | 66 | " |
| 2-16 | | 10.0 | — | | 0.14 | 93 | 0.35 | 72 | " |
| 2-17 | | 10.0 | III-1 | 9.0 | 0.11 | 214 | 0.28 | 123 | " |
| 2-18 | (12) | 2.5 | — | | 0.05 | 117 | 0.07 | 78 | invention |
| 2-19 | | 5.0 | — | | 0.06 | 155 | 0.07 | 138 | " |
| 2-20 | | 10.0 | — | | 0.06 | 123 | 0.07 | 120 | " |
| 2-21 | | 10.0 | III-1 | 9.0 | 0.04 | 275 | 0.05 | 234 | " |

B is described hereinbefore
E is described in Example 8

As shown in Table 2, the novel sensitizing dyes of the present invention give high sensitivity in comparison with comparative compounds. In addition thereto, the dyes of the present invention can keep high sensitivity and low fog density even when stored under high temperature and humidity conditions, while known sensitizing dyes cause a great lowering in sensitivity and an increase in fog.

The following dyes (the parenthesized numerals being coating weights) were added to the emulsion layers to prevent irradiation. Similar results were obtained.

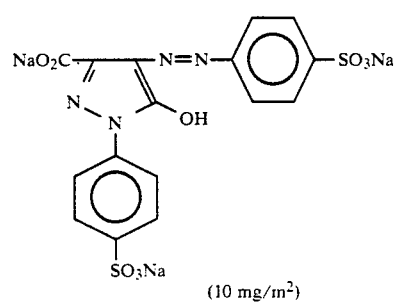

(10 mg/m²)

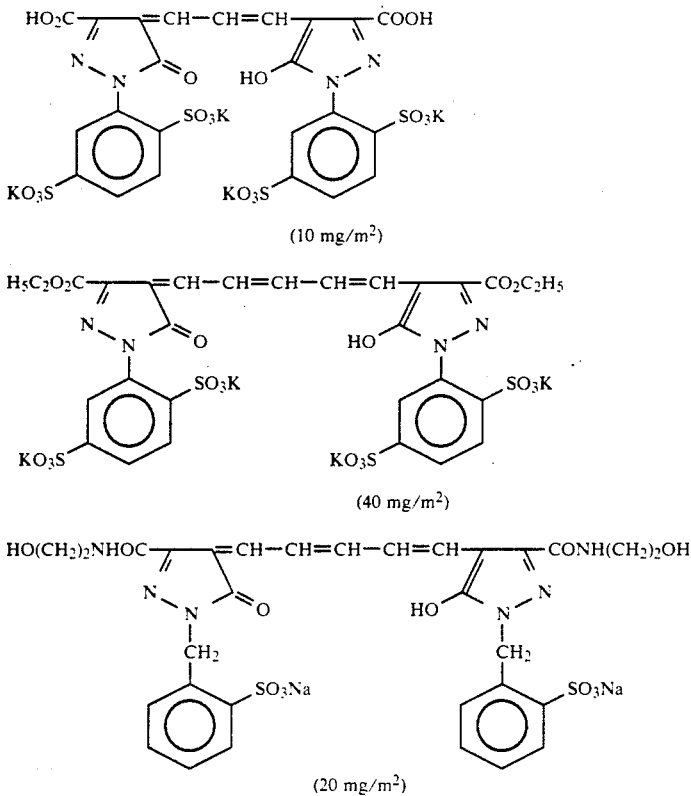

(10 mg/m²)

(40 mg/m²)

(20 mg/m²)

EXAMPLE 8

One thousand ml of water, 40 g of deionized ossein gelatin and 0.20 g of potassium bromide were placed in a reactor and well stirred while keeping the temperature at 75° C. A 0.0412N aqueous solution of silver nitrate and an aqueous solution of potassium bromide (0.0412N) and potassium iodide ($8.26 \times 10^{-4}$N) were simultaneously added at a flow rate of 4.01 ml/min thereto for 10 minutes. Subsequently, the flow rate of each solution was increased to 24.07 ml/min, and both solutions were simultaneously added thereto over a period of 7 minutes and 25 seconds. After 2 minutes from completion of the addition, a 1.18N aqueous solution of silver nitrate and an aqueous solution containing potassium bromide (1.18N) and potassium iodide (0.0241N) were simultaneously added thereto over a period of 80 minutes while the flow rate of the aqueous silver nitrate solution was continuously changed so that the initial flow rate thereof was 1.50 ml/min and the final flow rate thereof was 13.54 ml/min. During the addition of the solutions, silver potential in the reactor was kept at 0 mV against saturated calomel electrode.

Subsequently, a high-molecular coagulant composed of a copolymer of isobutene with monosodium maleate was added. The precipitated silver iodobromide grains were washed with water and desalted. Eighty g of deionized ossein gelatin and 328 ml of water were added thereto, pH was adjusted to 6.5 and pAg was adjusted to 8.9 at 40° C. Silver iodobromide grains in the emulsion were in a monodisperse octahedron form and had an average silver iodide content of 2.0 mol. % and a mean grain size of 0.88 μm (a coefficient of variation: 10.8%). The optimum amount of an aqueous solution of sodium thiosulfate and then the optimum amount of an aqueous solution of a mixture of potassium chloroaurate and potassium rhodanide were added to the emulsion, and ripening was carried out at 60° C. so as to give an optimum sensitivity.

The emulsions was divided into portions. The sensitizing dyes of the present invention, etc. given in Table 3 were added thereto. 0.18 g of 4-hydroxy-6-methyl-1,3,3a,7-tetrazaindene, 280 g of a 10% gel of deionized gelatin and 1.04 l of water were added to each of these emulsions, each amount being per kg of the emulsion. The resulting emulsion was coating on a polyethylene terephthalate film base in the following manner.

The amount of the coating solution was set so as to give 2.5 g of Ag/m² and 3.8 g of gelatin/m². An aqueous solution mainly comprising 0.1 g of sodium salt of dodecylbenzenesulfonate, 0.22 g/l of p-sulfostyrene sodium homopolymer, 4.0 g/l of 1,3-bis(vinylsulfonyl)-2-propanol and 50 g/l of gelatin was simultaneously coated as an upper layer in such an amount as to give 1.0 g of gelatin/m².

Each of these samples was divided into two portions. In the same manner as in Example 7, one of them was stored at 50° C. and 80% RH for 3 days, and the other was stored in a refrigerator at −20° C. for the same period of time. The coated samples were exposed to a tungsten light source (color temperature: 2854° K.) through a red sharp cut filter SC-66 (a filter which allows light having a wavelength longer than about 640 nm to be transmitted, manufactured by Fuji Photo Film Co., Ltd.) and a continuous wedge.

The exposed samples were developed with a developing solution having the following composition for 4 minutes. The development was stopped, and the samples were fixed and washed with water. The density of each sample was measured by a P type densitometer (manufactured by Fuji Photo Film Co., Ltd.) to determine the values of red filter sensitivity (SR) and fog.

| Composition of developing solution | |
|---|---|
| Water | 700 ml |
| Metol (i.e., 4-Methylaminophenol sulfate) | 3.1 g |
| Anhydrous sodium sulfite | 45.0 g |
| Hydroquinone | 12.0 g |
| Sodium carbonate monohydrate | 79.0 g |
| Potassium bromide | 1.0 g |
| Water to make | 2000 ml |
| pH (20° C.) | 10.33 |

The standard point of optical density for determining sensitivity is a point of a density of (Fog+0.2). The reciprocal of exposure amount giving that density is referred to as sensitivity. With regard to sample Nos. 3-1 to 3-8, the relative sensitivity given in Table 3 is represented by the relative value when the density of the sample No. 3-1 stored in the refrigerator is referred to as 100. With regard to sample Nos. 3-9 to 3-16, relative sensitivity is represented by relative value when the density of the sample No. 3-9 stored in the refrigerator is referred to as 100.

TABLE 3

| Sample No. | Sensitizing dye and amount added ($\times 10^{-5}$ mol/mol of Ag) | | Compound used in combination and amount added ($\times 10^{-4}$ mol/mol of Ag) | | Sample stored in refrigerator | | Sample stored at 50° C., 80% RH | | Remarks |
|---|---|---|---|---|---|---|---|---|---|
| | | | | | fog | relative sensitivity | fog | relative sensitivity | |
| 3-1 | F | 3.0 | — | | 0.02 | 100 (standard) | 0.06 | 55 | Comparison |
| 3-2 | | 6.0 | — | | 0.03 | 135 | 0.13 | 87 | " |
| 3-3 | | 12.0 | — | | 0.03 | 110 | 0.18 | 91 | " |
| 3-4 | | 12.0 | III-1 | 12.0 | 0.03 | 195 | 0.12 | 148 | " |
| 3-5 | (14) | 3.0 | — | | 0.02 | 129 | 0.03 | 100 | Invention |
| 3-6 | | 6.0 | — | | 0.03 | 155 | 0.04 | 135 | " |
| 3-7 | | 12.0 | — | | 0.03 | 102 | 0.05 | 98 | " |
| 3-8 | | 12.0 | III-1 | 12.0 | 0.02 | 219 | 0.04 | 200 | " |
| 3-9 | G | 3.5 | — | | 0.03 | 100 (standard) | 0.11 | 51 | Comparison |
| 3-10 | | 7.0 | — | | 0.04 | 123 | 0.19 | 76 | " |
| 3-11 | | 14.0 | — | | 0.05 | 115 | 0.26 | 83 | " |
| 3-12 | | 14.0 | III-15 | 12.0 | 0.04 | 174 | 0.17 | 141 | " |
| 3-13 | (16) | 3.5 | — | | 0.03 | 120 | 0.03 | 91 | Invention |
| 3-14 | | 7.0 | — | | 0.03 | 162 | 0.04 | 138 | " |
| 3-15 | | 14.0 | — | | 0.04 | 145 | 0.05 | 141 | " |
| 3-16 | | 14.0 | III-15 | 12.0 | 0.03 | 240 | 0.04 | 219 | " |

As shown in Table 3, the novel sensitizing dyes of the present invention give high sensitivity in comparison with comparative compounds. In addition thereto, the dyes can keep high sensitivity and low fog density even when stored under high temperature and humidity conditions, while the known sensitizing dyes for comparison cause a great lowering in sensitivity and an increase in fog density, as in Example 7.

Comparative dyes

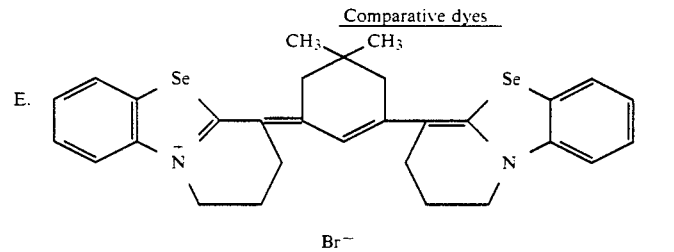

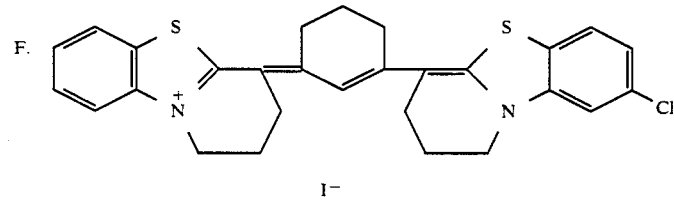

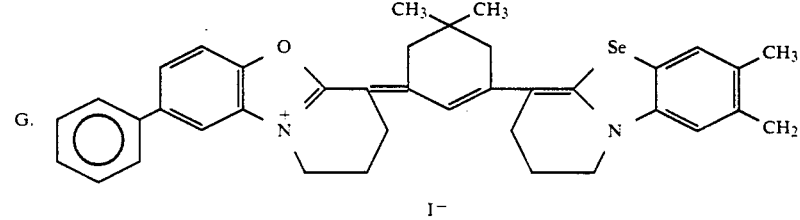

EXAMPLE 9

(antihalation layer)

Eighty g of gelatin was dissolved in one liter of water. Each of 80 ml of a 5% aqueous solution of poly(diethylaminoethyl methacrylate), 15 ml of a 20% aqueous solution of saponin, 100 ml of a 1% aqueous solution of chromium alum and 300 ml of a 3% aqueous solution of Compound (17) was added thereto to prepare a dye gelatin solution.

The dye gelatin solution was coated on a cellulose acetate photographic support to form an antihalation layer. A silver chlorobromide emulsion (silver bromide content: about 17 mol. %) panchromatically spectral-sensitized with a combination of anhydro-11-ethyl-3,3'-bis(sulfopropyl)naphtho[1,2-d]thiacarbocyanine hydroxide and 9-ethyl-3,3'-bis(sulfobutyl)selenacarbocyanine hydroxide was coated on that antihalation layer. Further, a protective gelatin layer was provided thereon to prepare a photographic material for plate making.

The thus-prepared photographic material was brought into close contact with a contact screen (133 lines per inch), exposed through an optical wedge and developed with the following developing solution having the following composition at 20° C. for 3 minutes. The material was then fixed, washed with water and dried by a conventional method.

| Composition of developing solution | |
|---|---|
| Water | 500 ml |
| Anhydrous sodium sulfite | 30 g |
| Paraformaldehyde | 7.5 g |
| Sodium bisulfite | 2.2 g |
| Boric acid | 7.5 g |
| Hydroquinone | 22.0 g |
| Potassium bromide | 1.6 g |
| Water to make | 1 liter |

After processing, stain was scarcely found on the unexposed area of the photographic material. Further, a halftone image having an excellent edge gradient could be obtained.

The compounds of general formula (I) are novel and useful as spectral sensitizing agents in the field of silver halide photographic emulsions. Further, the compounds can be used as dyes in silver halide photographic materials. When the compounds of general formula (I) are used in combination with specific supersensitizing agents, high spectral sensitivity can be obtained in silver halide photographic emulsions. Silver halide photographic materials containing the compounds of general formula (I) are superior in preservability (particularly spectral sensitivity and fog).

While the present invention has been described in detail and with reference to specific embodiments thereof, it is apparent to one skilled in the art that various changes and modifications can be made therein without departing from the spirit and scope of the present invention.

What is claimed is:

1. A silver halide photographic material containing at least one compound according to the following general formula (I):

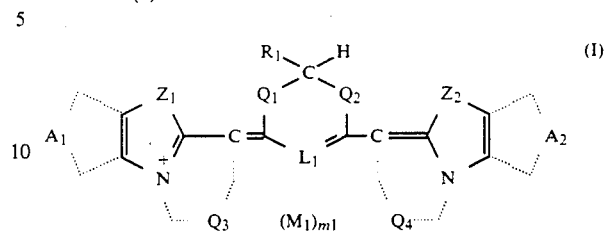

wherein $Z_1$ and $Z_2$ each represents an oxygen atom, a sulfur atom or a selenium atom; $R_1$ represents an alkyl group, an aryl group or a heterocyclic group; $Q_1$ and $Q_2$ each represents a methylene group; $Q_3$ and $Q_4$ each represents an atomic group required to form a five-membered, six-membered or seven-membered ring; $L_1$ represents a methine group; $A_1$ and $A_2$ each represents an atomic group required to form a benzene ring; $M_1$ represents a counter ion for neutralizing the electric charge of the compound; and $m_1$ represents the number required for neutralizing that electric charge.

2. The silver halide photographic material according to claim 1, wherein $R_1$ is an alkyl group having 1 to 18 carbon atoms.

3. The silver halide photographic material according to claim 1, wherein $R_1$ is an aryl group.

4. The silver halide photographic material according to claim 1, wherein $R_1$ is a methyl, ethyl or phenyl group.

5. The silver halide photographic material according to claim 1, wherein the material also contains a compound according to the following general formula (III):

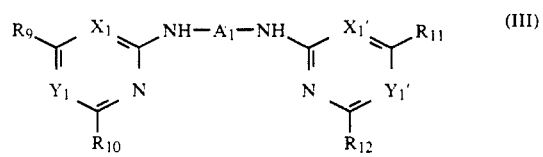

wherein $A_1$ represents a bivalent aromatic residue; $R_9$, $R_{10}$, $R_{11}$ and $R_{12}$ each represents a hydrogen atom, a hydroxyl group, an alkyl group, an alkoxy group, an aryloxy group, a halogen atom, a heterocyclic nucleus, a heterocyclic thio group, an arylthio group, an amino group, an alkylamino group, an arylamino group, an aralkylamino group, an aryl group or a mercapto group, each of which may be substituted; at least one of $A_1$, $R_9$, $R_{10}$, $R_{11}$ and $R_{12}$ is a group containing a sulfo group; $X_1$, $Y_1$, $X_1'$ and $Y_1'$ each represents —CH= or —N=, and at least one of $X_1$ and $Y_1$ and at least one of $X_1'$ and $Y_1'$ are —N=.

6. The silver halide photographic material according to claim 5, wherein $A_1$ contains a —SO$_3$M group, wherein M is a hydrogen atom or a cation.

* * * * *